(12) United States Patent
Furuta et al.

(10) Patent No.: US 12,115,762 B2
(45) Date of Patent: *Oct. 15, 2024

(54) DECORATIVE SHEET AND DECORATIVE MATERIAL USING SAME

(71) Applicant: DAI NIPPON PRINTING CO., LTD., Tokyo (JP)

(72) Inventors: Satoshi Furuta, Asaka (JP); Mayuko Komurasaki, Misato (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 17/762,454

(22) PCT Filed: Sep. 23, 2020

(86) PCT No.: PCT/JP2020/035862
§ 371 (c)(1),
(2) Date: Mar. 22, 2022

(87) PCT Pub. No.: WO2021/065637
PCT Pub. Date: Apr. 8, 2021

(65) Prior Publication Data
US 2022/0347987 A1    Nov. 3, 2022

(30) Foreign Application Priority Data

Sep. 30, 2019    (JP) .................................. 2019-181066

(51) Int. Cl.
*B32B 27/20*    (2006.01)
*B32B 7/12*    (2006.01)
(Continued)

(52) U.S. Cl.
CPC ................ *B32B 27/20* (2013.01); *B32B 7/12* (2013.01); *B32B 27/08* (2013.01); *B32B 27/306* (2013.01);
(Continued)

(58) Field of Classification Search
CPC . B32B 15/082; B32B 15/085; B32B 2250/03; B32B 2250/24; B32B 2255/10;
(Continued)

(56) References Cited

FOREIGN PATENT DOCUMENTS

| JP | S5814312 B2 | 3/1983 |
| JP | 2004-277516 A | 10/2004 |

(Continued)

OTHER PUBLICATIONS

Dec. 1, 2020 International Search Report issued in International Patent Application No. PCT/JP2020/035862.

*Primary Examiner* — Lawrence D Ferguson
(74) *Attorney, Agent, or Firm* — Oliff PLC

(57) ABSTRACT

There are provided a decorative sheet which has excellent weatherability and in which white pigment particles are dispersed well, and a decorative material using the decorative sheet, The decorative sheet includes at least a substrate and a surface protective layer, wherein the surface protective layer contains an ultraviolet absorber, and the substrate contains white pigment particles, and wherein the white pigment particles are titanium oxide particles having a coating containing Al element and Si element and formed on part or the whole of their surfaces, and contain Ti, Al and Si elements in the predetermined mass ratio, and a water vapor transmission rate of the decorative sheet satisfies the predetermined condition.

12 Claims, 2 Drawing Sheets

(51) Int. Cl.
*B32B 27/08* (2006.01)
*B32B 27/30* (2006.01)
*B32B 27/32* (2006.01)

(52) U.S. Cl.
CPC .......... *B32B 27/32* (2013.01); *B32B 2250/03* (2013.01); *B32B 2250/24* (2013.01); *B32B 2255/10* (2013.01); *B32B 2255/26* (2013.01); *B32B 2264/1022* (2020.08); *B32B 2307/4026* (2013.01); *B32B 2307/412* (2013.01); *B32B 2307/42* (2013.01); *B32B 2307/7246* (2013.01); *B32B 2307/732* (2013.01); *B32B 2451/00* (2013.01)

(58) Field of Classification Search
CPC ............ B32B 2255/26; B32B 2255/28; B32B 2264/1022; B32B 2264/403; B32B 2307/4026; B32B 2307/412; B32B 2307/42; B32B 2307/712; B32B 2307/7246; B32B 2307/732; B32B 2451/00; B32B 27/08; B32B 27/10; B32B 27/16; B32B 27/20; B32B 27/302; B32B 27/304; B32B 27/306; B32B 27/308; B32B 27/32; B32B 27/36; B32B 29/00; B32B 5/022; B32B 5/024; B32B 7/12; B44C 3/02; C09J 2301/122; C09J 7/243; C09J 7/50

See application file for complete search history.

(56) References Cited

FOREIGN PATENT DOCUMENTS

| | | |
|---|---|---|
| JP | 2006-182896 A | 7/2006 |
| JP | 2011-075931 A | 4/2011 |
| JP | 2015-038314 A | 2/2015 |
| JP | 2016-069572 A | 5/2016 |
| JP | 2016-168785 A | 9/2016 |
| JP | 2016-168787 A | 9/2016 |
| JP | 2016-183320 A | 10/2016 |
| JP | 2018-167495 A | 11/2018 |
| WO | 2019/189797 A1 | 10/2019 |

[Fig. 1]
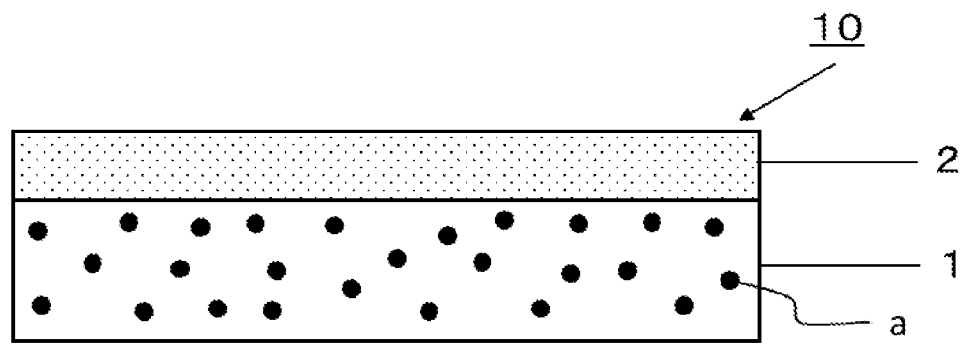
[Fig. 2]
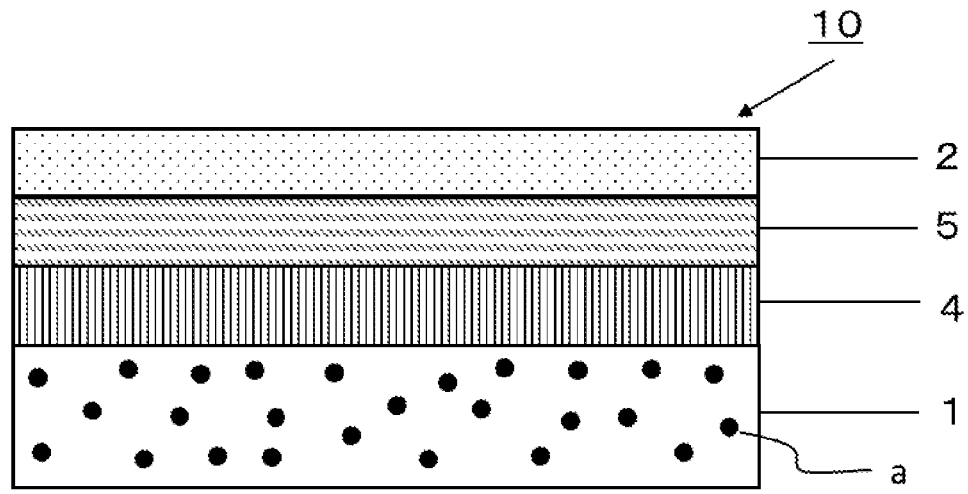

[Fig. 3]
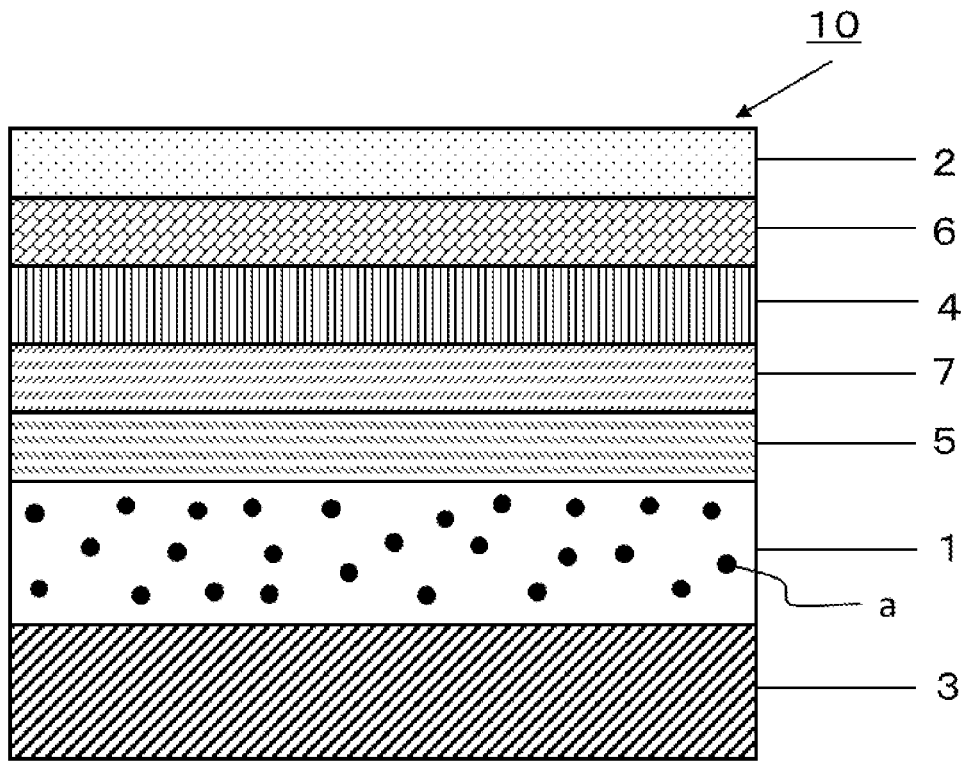
[Fig. 4]
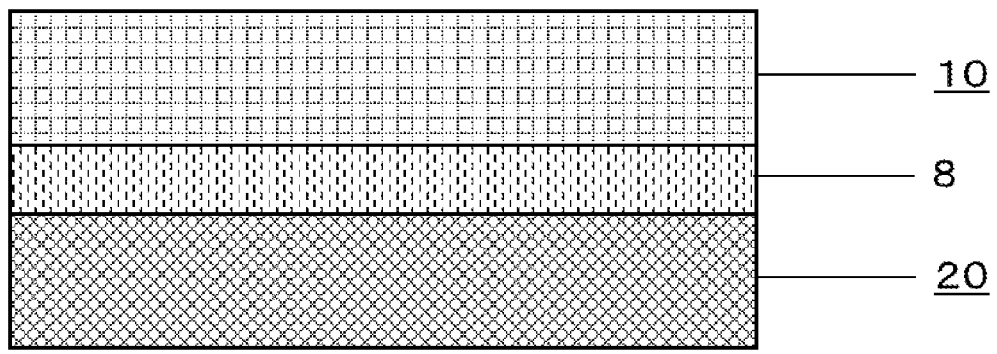

DECORATIVE SHEET AND DECORATIVE MATERIAL USING SAME

TECHNICAL FIELD

The present invention relates to a decorative sheet and to a decorative material using the sheet.

BACKGROUND ART

There are cases where a decorative plate is disposed on the surface of an interior member or an exterior member of an architectural structure such as a wall, a ceiling, a floor, or a front door; fittings or a fixture member such as a window frame, a door, a handrail, a skirting board, a crown molding, or a cable cover; a kitchen; furniture; a light electrical appliance; a cabinet of an OA instrument, etc. Similarly, there are cases where a decorative plate is disposed on the surface of an interior member or an exterior member of a vehicle. For the decorative plate, a laminate consisting of an adherend, which is a metal member such as a steel plate, a resin member or a wood member, and a decorative sheet attached to the adherend may be disposed. A substrate of the decorative sheet, which is to be used for such a member, is known to contain a white pigment such as titanium oxide ($TiO_2$) for the design purpose.

Titanium oxide exhibits a strong oxidizing power upon its photoexcitation. When a decorative member containing titanium oxide is used for an exterior member, the photocatalytic action of the titanium oxide can cause decomposition or a chemical reaction of a resin contained in the substrate of the decorative member. Such a phenomenon will result in degradation of the resin or delamination in the decorative member, leading to a decrease in the weatherability.

In this regard, a method is known which, in view of the fact that light that induces the photocatalytic action of titanium oxide includes ultraviolet light having a wavelength of not more than 380 nm, adds an ultraviolet absorber to a surface protective layer of a decorative sheet, which is to be exposed to light, thereby inhibiting the photocatalytic action of titanium oxide caused by ultraviolet light (see, for example, PTLs 1 and 2). A method is also known which involves the use of white pigment particles, composed of titanium oxide, whose surfaces are treated e.g. with an inorganic metal oxide in order to inhibit the photocatalytic action of the titanium oxide.

The decorative material used for members, etc. of the above intended uses includes a plastic product or the like using a decorative sheet having, for example, a polyvinyl chloride sheet as the substrate and a decorative layer, a surface protective layer and the like are optionally provided as decoration treatment (see, for example, PTL 3).

CITATION LIST

Patent Literature

PTL 1: JP 2016-168785A
PTL 2: JP 2016-168787A
PTL 3: JP 58-14312B

SUMMARY OF INVENTION

Technical Problem

However, when a decorative material such as the decorative sheet of the above PTL 3 is attached to the base body to produce the decorative member, an insufficient initial tight contact strength may raise the problem of causing the delamination at an end surface of the decorative material, so-called springback. For this reason, excellent application suitability is demanded for such a decorative material.

However, most of practical ultraviolet absorbers have an absorption wavelength range which includes the range from 380 nm to a visible light range. This is because the wavelength 380 nm is near the boundary wavelength between visible light and ultraviolet light. Therefore, when the content of an ultraviolet absorber in a surface protective layer of a decorative sheet is increased in order to prevent delamination over time and enhance the ultraviolet absorption capacity the surface protective layer will also absorb violet to blue light, belonging to the short-wavelength range of visible light. This may cause yellowing of the surface protective layer and thus deteriorate the design of the decorative member. Furthermore, the ultraviolet absorber may bleed from the surface protective layer and cause contamination or a change in the appearance, such as the gloss, of the surface of the decorative sheet. In addition, the decrease in the concentration of the ultraviolet absorber in the decorative sheet will result in a decrease in the weatherability.

The above-described white pigment particles of titanium oxide, having a coating on their surfaces formed by surface treatment, are sometimes poorly dispersed in a resin depending on the nature of the coating. This will result in a decorative member which cannot fully exert the effect of the ultraviolet absorber and thus has poor weatherability.

A method is also known which involves using carbon black or the like in a decorative member to absorb light having a wavelength that causes photoexcitation of titanium oxide, thereby inhibiting the photocatalytic action of titanium oxide. However, this method places a limitation on the design of the decorative member, and therefore is unfavorable.

On the other hand, when a decorative material produced by attaching the above decorative sheet to an adherend has been used, the problem may arise that mainly substrate constituting the decorative sheet provided on the outermost surface may be degraded due to the impacts from moisture in the atmosphere, wind and rain, and further ultraviolet by the solar radiation. The further problem may arise that the decorative sheet may be delaminated from the adherent caused by the degradation of an adhesive for adhesion of the decorative sheet to the adherent or the like.

It is therefore an object of the present invention to provide a decorative sheet which has excellent weatherability and in which white pigment particles are dispersed well, has excellent application suitability with a high initial tight contact strength in the application process, is free from the delamination even in long-term use, and achieves the excellent long-term adhesion, and to provide a decorative material using the decorative sheet.

Solution to Problem

The present inventors, through intensive studies, have found that the above object can be achieved by the present invention which may be embodied as follows:

[1] A decorative sheet including at least a substrate and a surface protective layer, wherein the surface protective layer contains an ultraviolet absorber, and the substrate contains white pigment particles, and wherein the white pigment particles are titanium oxide particles having a coating containing Al element and Si element and formed on part or the whole of their surfaces, and contain Ti, Al and Si elements in a mass ratio defined in the following (Condition 1), and
a water vapor transmission rate of the decorative sheet satisfies the following (Condition 2):
(Condition 1)
when Ti is taken as 1,
Al is not less than 0.02 and less than 0.20, and Si is more than 0.002 and not more than 0.070,
(Condition 2)
a water vapor transmission rate of the decorative sheet when measured in accordance with Testing Methods for Determination of the Water Vapor Transmission Rate of Moisture-Proof Packaging Materials (Dish Method) defined in JIS Z0208:1976 is not less than 0.75 g/m$^2$·24 h and not more than 45 g/m$^2$·24 h.

[2] A decorative material including the decorative sheet according to [1] and an adherend.

Advantageous Effects of Invention

According to the present invention, it is possible to provide a decorative sheet which has excellent weatherability and in which white pigment particles are dispersed well, has excellent application suitability with a high initial tight contact strength in the application process, is free from the delamination even in long-term use, and achieves the excellent long-term adhesion, and to provide a decorative material using the decorative sheet.

BRIEF DESCRIPTION OF DRAWINGS

FIG. 1 is a schematic cross-sectional view illustrating an embodiment of a decorative sheet according to the present invention.

FIG. 2 is a schematic cross-sectional view illustrating an embodiment of a decorative sheet according to the present invention.

FIG. 3 is a schematic cross-sectional view illustrating an embodiment of a decorative sheet according to the present invention, FIG. 4 is a schematic cross-sectional view illustrating an embodiment of a decorative material according to the present invention.

DESCRIPTION OF EMBODIMENTS

Decorative Sheet

The decorative sheet of the present invention is described below. In the present Description, the numerical values according to "not less than", "not more than", and "to" pertaining to the descriptions of numerical ranges are numerical values that can be in any combinations, and the numerical values in Examples can be used for the upper limit and the lower limit of a numerical value range.

The decorative sheet of the present invention includes at least a substrate and a surface protective layer. The surface protective layer contains an ultraviolet absorber, and the substrate contains white pigment particles.

The white pigment particles are titanium oxide particles having a coating containing Al element and Si element and formed on part or the whole of their surfaces, and contain Ti, Al and Si elements in a mass ratio defined in (Condition 1).

In the decorative sheet of the present invention, the substrate contains the white pigment particles which contain Ti, Al and Si elements in a mass ratio defined in (Condition 1), and thereby such white pigment particles can be well dispersed in the substrate. Further, the coating of the surfaces of the titanium oxide particles can inhibit the photocatalytic action of the titanium oxide, and can therefore achieve excellent weatherability.

The weatherability of the decorative sheet of the present invention can be enhanced by the ultraviolet absorber contained in the surface protective layer, while the use of the white pigment particles can achieve excellent weatherability as described above. This can avoid the use of a large amount of the ultraviolet absorber, thereby avoiding yellowing of the decorative sheet.

Further, unlike the case of inhibiting the photocatalytic action of titanium oxide by the use of carbon black or the like, the decorative sheet of the present invention is free from a limitation on the color of the sheet, and thus is excellent in the design of the sheet.

Water Vapor Transmission Rate

The decorative sheet of the present invention has a water vapor transmission rate of not less than 0.75 g/m$^2$·24 h and not more than 45 g/m$^2$·24 h when measured in accordance with Testing Methods for Determination of the Water Vapor Transmission Rate of Moisture-Proof Packaging Materials (Dish Method) defined in JIS Z0208:1976.

The decorative sheet of the present invention achieves a high initial tight contact strength in the application process of the decorative sheet when a water vapor transmission rate is in a particular range, and it is therefore possible to prevent the delamination at an end surface of the decorative sheet during the application due to an insufficient initial tight contact strength, so-called springback, and thus the excellent application efficiency can be obtained. On the other hand, in the case of forming a decorative member using the decorative sheet and an adherend via an adhesive layer, the degradation of the adhesive layer between the decorative sheet and the adherend can be mainly prevented, and consequently the delamination caused by such a degradation is prevented to thus achieve the excellent long-term adhesion free from the delamination even when used for a long term. Thus, the water vapor transmission rate of the decorative sheet of the present invention being in a particular range enables the compatibility between the excellent application suitability due to a high initial tight contact strength in the application process and the long-term adhesion free from the delamination even when used for a long term.

The decorative sheet of the present invention has a water vapor transmission rate of not less than 0.75 g/m$^2$·24 h and not more than 45 g/m$^2$·24 h. An effect achieved by such a water vapor transmission rate is described in greater detail. When a water vapor transmission rate is less than 0.75 g/m$^2$·24 h, an adhesion failure caused by insufficient curing of an adhesive used in an adhesive layer is liable to occur during the formation of a decorative material by attaching the decorative sheet to the adherend via the adhesive layer. Consequently, an excellent initial adhesive strength cannot be obtained, failing to obtain the excellent application suitability. On the other hand, when a water vapor transmission rate is more than 45 g/m$^2$·24 h, the degradation of a substrate and the hydrolysis of an adhesive used in the adhesive layer are caused in long-term use due to the impacts from moisture in the atmosphere, wind and rain, and further ultraviolet by the solar radiation, likely leading to the delamination between the decorative sheet and the adherend, failing to obtain the long-term adhesion free from the delamination even when used for a long term. Thus, as already described, when the decorative sheet of the present invention has a water vapor transmission rate in a particular range, the excellent application suitability due to a high initial tight contact strength in the application process and the long-term adhesion free from the delamination even when used for a long term can be compatible.

In order to enhance the long-term adhesion and the application suitability, the water vapor transmission rate is not less than 1.2 g/m²·24 h, more preferably 1.5 g/m²·24 h, even more preferably not less than 2.5 g/m²·24 h, and even furthermore preferably not less than 4.5 g/m²·24 h, and the upper limit is preferably 40 g/m²·24 h or less, more preferably 35 g/m²·24 h or less, even more preferably 30 g/m²·24 h or less, and even furthermore preferably 20 g/m²·24 h or less.

In the present invention., the water vapor transmission rate can be mainly adjusted by the type of a material constituting the below-described substrate, and in the case of having a transparent resin layer, the type of a material constituting the transparent resin layer.

FIG. 1 is a cross-sectional view illustrating a representative form of a decorative sheet. 10 of the present invention.

The decorative sheet 10 has a substrate containing white pigment particle a and a surface protective layer 2.

Each layer constituting the decorative sheet of the present invention will be described below in. greater detail.

Substrate

White Pigment Particles

The white pigment particles for use in the present invention are titanium oxide particles having a coating containing Al element and Si element and formed on part or the whole of their surfaces. The white pigment particles contain Ti, Al and Si elements in a mass ratio defined in the following (Condition 1):

(Condition 1)
when Ti is taken as 1, Al is not less than 0.02 and less than 0.20, and Si is more than 0.002 and not more than 0.070.

If the mass ratio of Al falls out of the above range, dispersion of the white pigment particles in the substrate may be poor, causing uneven coloring of the substrate. If the dispersion of the white pigment particles is poor, in a case where a light stabilizer is contained in the substrate, the concentration of the light stabilizer, when used in the substrate, may be low locally. This may result in failure to achieve excellent weatherability and, in addition, can cause delamination. If the mass ratio of Si falls out of the above range, the decorative sheet may have poor weatherability.

The mass ratio of Al is preferably not less than 0.025, more preferably not less than 0.03 in order to enhance dispersion of the white pigment particles. The mass ratio of Al is preferably not more than 0.16, more preferably not more than 0.12.

The mass ratio of Si is preferably not less than 0.003, more preferably not less than 0.004 in order to enhance weatherability. The mass ratio of Si is preferably not more than 0.060, more preferably not more than 0.040.

Titanium oxide can be classified into the anatase type, the brookite type and the rutile type. Titanium oxide of the rutile type is preferably used as the white pigment particles from the viewpoint of the masking properties of the white pigment and the weatherability.

The white pigment particles, which are titanium oxide particles having a coating containing Al element and Si element and formed on part or the whole of their surfaces, can be obtained by subjecting the titanium oxide particles to surface treatment with an inorganic metal oxide containing at least Al element and Si element.

Alumina and silica, for example, can be used as the inorganic metal oxide. The coating formed on the surfaces of the titanium oxide particles may contain an element(s) other than Al and Si. Zirconia, tin oxide, antimony oxide, zinc oxide, etc. can be used as an inorganic metal oxide containing an element other than Al and Si.

The value [(a×b)/100], obtained by dividing by 100 the product of the content a [% by mass] of the white pigment particles in the substrate and the thickness b [μm] of the substrate, is preferably not less than 0.1, more preferably not less than 2.0, and even more preferably not less than 5.0. The value [(a×b)/100] is preferably not more than 20.0, more preferably not more than 15.0, and even preferably not more than 10.0. With regard to the concentration of the white pigment particles in the substrate, the value [(a×b)/100] is preferably within the above range in order for the decorative sheet to achieve excellent weatherability.

The average particle diameter of the primary particles of the white pigment particles is preferably not less than 0.02 μm and not more than 1.5 μm, more preferably not less than 0.15 μm and not more than 0.5 μm, and even preferably not less than 0.1 μm and not more than 0.3 μm. When the average particle diameter of the white pigment particles is within the above range, it is possible to provide a decorative sheet which is excellent in the dispersion of the white pigment particles and in the weatherability, and which has high masking properties and good design.

The average particle diameter herein refers to a value that can be determined as a mass average value D50 in the measurement of particle size distribution by a laser diffraction method.

The substrate may be either a coated film obtained by applying a paint containing the white pigment particles to a film, or a film produced by molding of a resin composition containing the white pigment particles.

When the substrate is a coated film obtained by applying a paint containing the white pigment particles to a film, there is no particular limitation on a binder resin for use in the paint. Examples of usable binder resins include a polyurethane resin, a polyolefin resin, a vinyl chloride resin, a vinyl chloride-vinyl acetate copolymer resin, a vinyl chloride-vinyl acetate-acrylate copolymer resin, a chlorinated polypropylene resin, an acrylic resin, a polyester resin, a polyamide resin, a butyral resin, a polystyrene resin, a nitrocellulose resin, and a cellulose acetate resin. These binder resins can be used singly or in a combination of two or more. In view of easily adjusting the water vapor transmission rate, a polyolefin resin and a vinyl chloride resin are preferred, and a polyolefin resin is more preferred.

The polyolefin resin can also preferably use from the polyethylene resins and the polypropylene resins described as specific examples of the below-described resin constituting the substrate.

When a vinyl chloride resin is used as the transparent resin layer, the vinyl chloride resins described as specific examples of the above resins constituting the substrate can be preferably used.

The substrate may be composed of a single layer of the above resin, or two or more layers of the same resin or different resins. When the substrate is the above-described coated film, the decorative sheet preferably includes the below-described backing substrate.

When the substrate is a film produced by molding of a resin composition. containing the white pigment particles, a thermoplastic resin may be used in the composition. Examples of the thermoplastic resin include a polyolefin resin such as polypropylene or polyethylene, a polyester resin, a polycarbonate resin, an acrylonitrile-butadiene-styrene resin (hereinafter also referred to as an "ABS resin"), an acrylic resin, and a vinyl chloride resin. Among them, in view of the processing characteristics, a polyolefin resin, a polyester resin, a polycarbonate resin, a vinyl chloride resin, and an ABS resin are preferred, and a polyolefin resin is especially preferred.

In view of easily adjusting the water vapor transmission rate to be within the above range, versatility, usability as a decorative material, and the like, and enhancing the long-term adhesion and the application suitability, a polyolefin resin and a vinyl chloride resin are more preferred among the above regardless of a coated film obtained by applying a paint containing the white pigment particles to a film, or a film produced by molding of a resin composition containing the white pigment. In view of the environmental performance, a polyolefin resin is even more preferred. In the present invention, the above resins can be used singly or in a combination of two or more. In the case of combining two or more, substrates composed of respective single resin can be combined, or two or more resins are mixed to use as a single substrate.

Examples of polyolefin resins include, more specifically, olefin homopolymers such as ethylene, propylene, and butane; various copolymers such as a block copolymer or a random copolymer of ethylene-propylene; copolymers of at least one of ethylene and propylene and at least one of other olefins such as butane, pentane, and hexane; and copolymers of at least one of ethylene and propylene and at least one of other monomers such as vinyl acetate and vinyl alcohol.

In order to easily adjust the water vapor transmission rate to the above range and enhance the long-term adhesion and the application suitability, a polyethylene resin containing ethylene as the constituent unit and a polypropylene resin containing propylene as the constituent unit are preferred among the above, and a polypropylene resin is preferred.

The water vapor transmission rate is easily and reliably adjusted by adjusting the thickness of the layers such as the substrate and the transparent resin layer in which resins are used, hence preferred. In order to adjust the water vapor transmission rate of the decorative sheet of the present invention to the above predetermined range, it is preferred that the thicknesses of the substrate and the transparent resin layer be in predetermined ranges depending on materials, preferably the type of resins, constituting these layers, in view of thickness ratios accounting for the total thickness of the decorative sheet in the laminate structure of the decorative sheet.

For easily adjusting the water vapor transmission rate of the decorative sheet to be within the above predetermined range, the thickness of the substrate, when using a polyethylene resin, a polypropylene resin, and a vinyl chloride resin, may be preferably selected from a range of not less than 40 μm and not more than 200 μm, in view of the laminate structure of the decorative sheet and an intended water vapor transmission rate.

The polyethylene resin may be, more specifically, an ethylene homopolymer, thus, polyethylene, or may be a copolymer of ethylene and other comonomers copolymerizable with ethylene (e.g. α-olefins such as propylene, 1-butene, 1-hexane, and 1-octane; vinyl acetate, and vinyl alcohol). Examples of polyethylenes include high-density polyethylene (HDPE), medium-density polyethylene (MDPE), low-density polyethylene (LDPE), linear low-density polyethylene (LLDPE), very low-density polyethylene VLDPE), ultra-high molecular weight polyethylene (UHMWPE), and crosslinked polyethylene (PEX). These polyethylene resins can be used singly or in a combination of two or more.

The polypropylene resin may be a propylene homopolymer, thus, polypropylene, or may be a copolymer of propylene and other comonomers copolymerizable with propylene (e.g. α-olefins such as ethylene, 1-butene, 1-hexane, and 1-octane; vinyl acetate, and vinyl alcohol). These polypropylene can be used singly or in a combination of two or more.

When a propylene homopolymer (polypropylene) is used, a controlled degree of crystallinity can adjust the water vapor transmission rate of the substrate. Generally, the higher a degree of crystallinity the lower a water vapor transmission rate of the polypropylene resin tends to be. When a polypropylene resin having a thickness in the above range from not less than 40 μm and not more than 200 μm is used as the substrate, the degree of crystallinity thereof is preferably not less than 30%, and more preferably not less than 40%, and the upper limit is preferably 80% or less, and more preferably 70% or less.

Additionally, when a propylene homopolymer (polypropylene) is used, a controlled mass ratio of isotactic polypropylene to atactic polypropylene can also adjust the water vapor transmission rate of the substrate. Generally, when compared with the case where the percentage of the atactic polypropylene in the polypropylene is 100% by mass, the water vapor transmission rate of the substrate can be reduced by adding isotactic polypropylene. In this case, the mass ratio of atactic polypropylene to isotactic polypropylene is preferably 0/100 to 20/80 in view of easily adjusting the water vapor transmission rate.

When a vinyl chloride resin is used, the vinyl chloride resin can be a homopolymer of a vinyl chloride monomer, thus, polyvinyl chloride, or can be a copolymer obtained by copolymerizing a vinyl chloride monomer with a monomer copolymerizable with the vinyl chloride monomer.

Examples of monomers copolymerizable with a vinyl chloride monomer include vinyl esters such as vinyl acetate and vinyl propionate; acrylates such as methyl acrylate and butyl acrylate; methacrylates such as methyl methacrylate and ethyl methacrylate; maleates such as butyl maleate and diethyl maleate; fumarates such as dibutyl fumarate and diethyl fumarate; vinyl ethers such as vinyl methyl ether, vinyl butyl ether, and vinyl octyl ether; vinyl cyanides such as acrylonitrile and methacrylonitrile; olefins such as ethylene, propylene, butylene, and styrene; dienes such as isoprene and butadiene; vinylidene halides and vinyl halides other than vinyl chlorides such as vinylidene chloride and vinyl bromide; and allyl phthalates such as diallyl phthalate. These monomers can be used singly or in a combination of two or more.

The average degree of polymerization of a vinyl chloride resin is preferably not less than 500 and not more than 4000, more preferably not less than 700 and not more than 3900, and even more preferably not less than 1000 and not more than 3800, for easily adjusting the water vapor transmission rate to be within the above range and enhancing the long-term adhesion and the application suitability. When an average degree of polymerization is in the above range, excellent mechanical strengths and formability can be obtained. In the present Description, an average degree of polymerization is the average degree of polymerization measured in accordance with JIS K6721.

In the present embodiment, when a vinyl chloride resin is used, it is preferred to add a plasticizer for easily adjusting the water vapor transmission rate to be within the above range, enhancing the long-term adhesion and the application suitability, and also enhancing the processing properties.

There is no particular limitation on the plasticizer as long as it is compatible with a vinyl chloride resin, and examples include phthalate plasticizers such as dibutyl phthalate (DBP), dioctyl phthalate (DOP), diisononyl phthalate (DINP), diisodecyl phthalate (DIDP), and diundecyl phthalate (DUP); adipate plasticizers such as dibutyl adipate; phosphate plasticizers such as tributyl phosphate, tricresyl phosphate, and triphenyl phosphate; trimellitate plasticizers such as tributyl trimellitate and trioctyl trimellitate; known various polyester plasticizers such as adipate polyesters; and citrates such as acetyl tributyl citrate and acetyl trioctyl citrate. Among them, phthalate plasticizers, adipate plasticizers, and polyester plasticizers are preferred for easily adjusting the water vapor transmission rate to be within the above range, enhancing the long-term adhesion and the application suitability, and also enhancing the processing properties, and phthalate plasticizers and polyester plasticizers are more preferred. These plasticizers can be used singly or in a combination of two or more.

The content of a plasticizer may be appropriately adjusted depending on an intended water vapor transmission rate but generally, not unconditionally, as an additive for a plasticizer is increased, a water vapor transmission rate of a vinyl chloride resin tends to increase. In view of this point, the content of a plasticizer based on 100 parts by mass of a vinyl chloride resin is preferably not less than 15 parts by mass, more preferably not less than 20 parts by mass, and even. more preferably not less than 25 parts by mass, and the upper limit is preferably 50 parts by mass or less, more preferably 45 parts by mass or less, and even more preferably 35 parts by mass or less. When a content of the plasticizer is within the above range, the water vapor transmission rate can be easily adjusted to be within an intended range and the long-term adhesion and the application suitability can be enhanced. When a content of the plasticizer is not less than 20 parts by mass, a vinyl chloride resin can be flexible and the processing properties can be enhanced, whereas a content of the plasticizer is not more than 50 parts by mass, the plasticizer can be prevented from bleeding out, the water vapor transmission rate is easily adjusted to an intended range with stability, and the long-term adhesion and the application suitability can be enhanced.

Especially, when a phthalate plasticizer is used to easily adjust the water vapor transmission rate to an intended range and enhance the long-term adhesion and the application suitability, the content thereof based on 100 parts by mass of a vinyl chloride resin is preferably not less than 25 parts by mass, more preferably not less than 30 parts by mass, and even more preferably not less than 35 parts by mass, and the upper limit is preferably 50 parts by mass or less, more preferably 45 parts by mass or less, and even more preferably 40 parts by mass or less. When a polyester plasticizer is used, the content thereof based on 100 parts by mass of a vinyl chloride resin is preferably not less than 15 parts by mass, more preferably not less than 18 parts by mass, and even more preferably not less than 20 parts by mass, and the upper limit is preferably 35 parts by mass or less, more preferably 30 parts by mass or less, and even more preferably 25 parts by mass or less.

In the present invention, these resins can be used singly or in a cormbination of two or more.

The substrate may be composed of a single layer of the above resin, or two or more layers of the same resin or different resins.

The substrate may be a colored substrate additionally containing a colorant other than the white pigment particles. Examples of the colorant. include an inorganic pigment such as carbon black, iron black, chrome yellow, titanium yellow, red iron oxide, cadmium red, ultramarine blue, or cobalt blue; an organic pigment or dye such as quinacridone red, isoindolinone yellow, or phthalocyanine blue; a metal pigment such as scaly foil pieces of aluminum, brass, or the like; and a pearlescent (pearl) pigment such as scaly foil pieces of titanium dioxide-coated mica, basic lead carbonate, or the like, There is no particular limitation on the manner of coloring the substrate; either transparent coloring or opaque coloring may be employed.

The substrate may optionally contain an additive. Examples of the additive include an inorganic filler such as calcium carbonate or clay, a flame retardant such as magnesium hydroxide, an antioxidant, a lubricant, a foaming agent, a light stabilizer, and an ultraviolet absorber. Among them, in order to enhance weatherability, a light stabilizer and an ultraviolet absorber are preferred, and a light stabilizer is more preferred. These additives may be used singly or in a combination of two or more.

Light Stabilizer

A hindered amine light stabilizer is preferably used as the light stabilizer. A high-molecular weight hindered amine compound, which is less likely to bleed out, can also be used.

Examples of usable light stabilizers include
4-benzoyloxy-2,2,6,6-tetramethyl piperidine,
1,2,2,6,6-pentamethyl-4-piperidinyl (meth)acrylate,
bis(2,2,6,6-tetramethyl-4-piperidyl) sebacate,
bis(1,2,2,6,6-pentamethyl-4-piperidyl) sebacate,
bis(1-octyloxy-2,2,6,6-tetramethyl-4-piperidinyl) sebacate,
bis(1,2,2,6,6-pentamethyl-4-piperidinyl) sebacate,
methyl(1,2,2,6,6-pentamethyl-4-piperidinyl) sebacate,
2,4-bis[N-butyl-N-(1-cyclohexyloxy-2,2,6,6-tetramethyl-4-piperidinyl)amino]-6-(2-hydroxyethylamine)-1,3,5-tirazine),
tetrakis(1,2,2,6,6-pentamethyl-4-piperidyl)-1,2,3,4-butanetetracarboxylate,
bis(1-undecanoxy-2,2,6,6-tetramethyl piperidine-4-yl) carbonate,
bis(1,2,2,6,6-pentamethyl-4-piperidyl)-2-(3,5-di-t-butyl-4-hydroxybenzyl)-2-n-butyl malonate,
bis(1,2,2,6,6-pentamethyl-4-piperidyl)-2-butyl-2-(3,5-di-tert-butyl-4-hydroxybenzyl) malonate, tetra(2,2,6,6-tetramethyl-4-piperidinyl) butane tetracarboxylate, tetra(1,2,2,6,6-pentamethyl-4-piperidyl) butane
tetracarboxylate, bis(2,2,6,6-tetramethyl-4-piperidyl)·di(tridecyl) butane
tetracarboxylate, bis(1,2,2,6,6-pentamethyl-4-piperidyl)·di(tridecyl) butane tetracarboxylate,
3,9-bis[1,1-dimethyl-2-{tris(2,2,6,6-tetramethyl-4-piperidyloxycarbonyloxy) butylcarbonyloxy} ethyl]-2,4,8,10-tetraoxaspiro[5,5]undecane,
3,9-bis[1,1-dimethyl-2-{tris(1,2,2,6,6-pentamethyl-4-piperidyloxycarbonyloxy) butylcarbonyloxy} ethyl]-2,4,8, 10-tetraoxaspiro[5,5]undecane,
1,5,8,12-tetrakis[4,6-bis{N-(2,2,6,6-tetramethyl-4-piperidyl) butylamino}-1,3,5-triazine-2-yl]-1,5,8,12-tetraazadodecane, the condensation product of 1-(2-hydroxyethyl)-2,2,6,6-tetramethyl-4-piperidinol and dimethyl succinate, the condensation product of 2-tertoctylamino-4,6-dichloro-s-triazine and N,N'-bis(2,2,6,6-tetramethyl-4-piperidyl) hexamethylenediamine, and the condensation product of N,N'-bis(2,2,6,6-tetramethyl-4-piperidyl) hexamethylenediamine and dibromoethane.

The high-molecular weight hindered amine compound may be a copolymer with ethylene or another monomer (e.g. an ethylene-cyclic aminovinyl compound copolymer), or a graft copolymer of a polymer such as polyethylene. In such a case, the substrate may contain a hindered amine light stabilizer in addition to such a high-molecular weight hindered amine compound, for example, an ethylene-cyclic aminovinyl compound copolymer.

These light stabilizers may be used singly or in a combination or two or more.

Among them, a hindered amine compound having at least two piperidine rings in its molecule and having a molecular weight of not less than 500 can be preferably used. If the number of piperidine rings in the molecule is not less than 2, it can obtain sufficient weatherability, hence preferred. If the molecular weight is not less than 500, the hindered amine compound is less volatile, and it can, therefore, obtain long-term weatherability, hence preferred.

The content of the light stabilizer in the substrate is preferably not less than 0.1 parts by mass, more preferably not less than 1 part by mass, even more preferably not less than 3 parts by mass based on 100 parts by mass of the resin constituting the substrate. On the other hand, the content of the light stabilizer in the substrate is preferably not more than 10 parts by mass, more preferably not more than 8 parts by mass, even more preferably not more than 6 parts by mass based on 100 parts by mass of the resin constituting the substrate. When the content of the light stabilizer is within the above range, it is unlikely to bleed out and can achieve superior weatherability.

When the substrate is a coated film, the thickness of the coated film is preferably not less than 0.5 µm, more preferably not less than 1 µm, and even more preferably not less than 3 µm from a design viewpoint. The thickness of the coated film is preferably not more than 30 µm, more preferably not more than 20 µm, and even more preferably not less than 10 µm.

When the substrate is a molded film, the thickness of the molded film is preferably not less than 20 µm, preferably not less than 40 µm, more preferably not less than 50 µm and even more preferably not less than 60 µm in view of enhancing the weatherability, also enhancing the processing characteristics and the scratch resistance, and easily adjusting the water vapor transmission rate of the decorative sheet to be within the above predetermined range. The thickness of the molded film is preferably not more than 200 µm, more preferably not more than 150 µm, and even more preferably not less than 100 µm.

Surface Protective Layer

The surface protective layer preferably contains a cured product of a curable resin composition. The cured product may be a cured product of a thermosetting resin composition, and it is preferably a cured product of an ionizing radiation-curable resin composition from the viewpoint of excellent weatherability and in order to enhance the surface characteristics such as scratch resistance.

The ionizing radiation-curable resin is a resin which is capable of being crosslinked and cured upon irradiation with ionizing radiation and which has an ionizing radiation-curable functional group. The ionizing radiation-curable functional group herein refers to a group capable of being crosslinked and cured upon irradiation with ionizing radiation. A functional group having an ethylenic double bond, such as a (meth)acryloyl group, a vinyl group or an allyl group, is an exemplary preferable ionizing radiation-curable functional group. The ionizing radiation refers to electromagnetic radiation or charged particle radiation having an energy quantum that can polymerize or crosslink molecules. While ultraviolet (UV) radiation or electron beam (EB) radiation is generally used, electromagnetic radiation, such as an X-ray radiation or γ-ray radiation, or charged particle radiation, such as an α-ray radiation or ion beam radiation, may also be used.

A specific ionizing radiation-curable resin to be used can be appropriately selected from among polymerizable monomers and polymerizable oligomers which are conventionally used as ionizing radiation-curable resins.

A (meth)acrylate monomer having a radical-polymerizable unsaturated group in the molecule, in particular a polyfunctional (meth)acrylate monomer, is preferably used as a polymerizable monomer. As used herein, "(meth)acrylate" refers to "acrylate or methacrylate".

The polyfunctional (meth)acrylate monomer can be exemplified by a (meth)acrylate monomer having 2 or more ionizing radiation-curable functional groups in the molecule and having at least a (meth)acryloyl group as the functional group.

In order to enhance the weatherability and the scratch resistance, and also enhance the processing characteristics, the number of the functional groups is preferably not less than 2 and not more than 8, more preferably not less than 2 and not more than 6, even more preferably not less than 2 and not more than 4, and especially preferably not less than 2 and. not more than 3. These polyfunctional (meth)acrylate monomers may be used singly or in a combination of two or more.

The polymerizable oligomer can be exemplified by a (meth)acrylate oligomer having 2 or more ionizing radiation-curable functional groups in the molecule and having at least a (meth)acryloyl group as the functional group. Examples of the (meth)acrylate oligomer include a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (meth)acrylate oligomer.

Examples of the polymerizable oligomer further include a highly hydrophobic polybutadiene (meth)acrylate oligomer having a (meth)acrylate group in a side chain of a polybutadiene oligomer, a silicone (meth)acrylate oligomer having a polysiloxane bond in the main chain; an aminoplast resin (meth)acrylate oligomer obtained by modifying an aminoplast resin having a number of reactive groups in the small molecule, and an oligomer having a cation-polymerizable functional group in the molecule such as a novolak epoxy resin, a bisphenol epoxy resin, an aliphatic vinyl ether, an aromatic vinyl ether, or the like.

These polymerizable oligomers may be used singly or in a combination of two or more. In order to enhance the weatherability and the scratch resistance, and also enhance the processing characteristics, a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (met)acrylate oligomer are preferred, and a urethane (meth)acrylate oligomer and a polycarbonate (meth)acrylate oligomer are more preferred, and a urethane (meth)acrylate oligomer is even more preferred.

In order to enhance the weatherability and the scratch resistance, and also enhance the processing characteristics, the number of functional groups of each of the polymerizable oligomers is preferably not less than 2 and not more than 8. The upper limit is more preferably 6 or less, even more preferably 4 or less, especially preferably 3 or less.

The weight-average molecular weight of each of the polymerizable oligomers is preferably not less than 2,500 and not more than 7,500, more preferably not less than 3,000 and not more than 7,000, and even more preferably not less than 3,500 and not more than 6,000. The weight-average molecular weight herein refers to an average molecular weight which is measured by GPC analysis and calculated in terms of standard polystyrene. The use of a polymerizable oligomer, having the above-described weight-average molecular weight and number of functional groups, in the present invention can prevent bleeding of an ultraviolet absorber not only from the surface protective layer but from an intermediate resin layer as well, thus achieving superior weatherability. Furthermore, the surface protective layer can have an appropriate hardness, and can therefore enhance the scratch resistance and the processing characteristics of the decorative sheet and the decorative material of the present invention.

In the present invention, in order to reduce the viscosity of the ionizing radiation-curable resin, a monofunctional (meth)acrylate can be appropriately used together with the above-described polyfunctional (meth)acrylate as long as the intended effect of the present invention is not impaired. In that case, either a single monofunctional (meth)acrylate or a combination of two or more monofunctional (meth)acrylates may be used.

In the present invention, the ionizing radiation-curable resin preferably contains the polymerizable oligomer in order to enhance the weatherability and the scratch resistance, and also enhance the processing characteristics. The content of the polymerizable oligomer in the ionizing radiation-curable resin is preferably not less than 80% by mass, more preferably not less than 90% by mass, even more preferably not less than 95% by mass, and especially preferably 100% by mass.

Ultraviolet Absorber

The ultraviolet absorber for use in the surface protective layer can be exemplified by a triazine ultraviolet absorber, a cyanoacrylate ultraviolet absorber, a benzotriazole ultraviolet absorber, and a benzophenone ultraviolet absorber. Among them, a triazine ultraviolet absorber is preferred in order to make discoloration little upon irradiation with the above-described ionizing radiation. Either a single ultraviolet absorber or a combination of two or more ultraviolet absorbers may be used.

Among triazine ultraviolet absorbers, a hydroxyphenyl triazine ultraviolet absorber in which three organic groups, selected from a hydroxyphenyl group, an alkoxyphenyl group, and an organic group containing one of these groups, are connected to the triazine ring is more preferred, and a hydroxyphenyl triazine ultraviolet absorber represented by the following general formula (1) is even more preferred. Since the surface protective layer is located at the outermost surface of the decorative sheet, an ultraviolet absorber which hardly bleeds from the layer is preferred. The hydroxyphenyl triazine ultraviolet absorber represented by the following general formula (1) has a branched structure, and therefore it is expected to hardly bleed out. Thus, in order to enhance the weathering performance, it is especially preferred as an ultraviolet absorber for use in the surface protective layer.

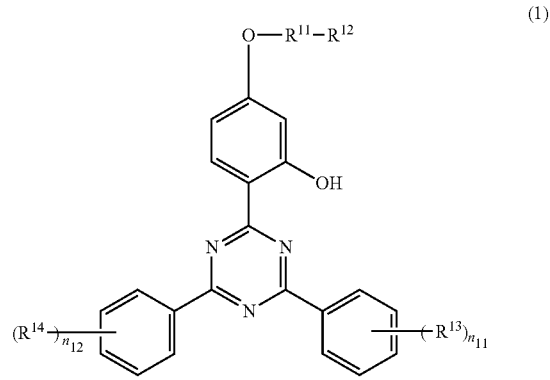

In the general formula (1), $R^{11}$ is a divalent organic group; $R^{12}$ is an ester group represented by —C(=O)O$R^{15}$; $R^{13}$, $R^{14}$ and $R^{15}$ are each independently a monovalent organic group; and $n_{11}$ and $n_{12}$ are each independently an integer of not less than 1 and not more than 5.

The divalent organic group $R^{11}$ can be exemplified by an aliphatic hydrocarbon group such as an alkylene group or an alkenylene group and, in order to enhance weatherability, an alkylene group is preferred. The number of carbon atoms is preferably not less than 1, and the upper limit is preferably 20 or less, more preferably 12 or less, even more preferably 8 or less, and especially preferably 4 or less. The alkylene group and the alkenylene group may each be linear, branched, or cyclic, preferably linear or branched.

Examples of the alkylene group having 1 to 20 carbon atoms include a methylene group, a 1,1-ethylene group, a 1,2-ethylene group, various propylene groups such as 1,3-propylene, 1,2-propylene, and 2,2-propylene (as used herein, the term "various" includes linear and branched groups, and isomers thereof), various butylene groups, various pentylene groups, various hexylene groups, various heptylene groups, various octylene groups, various nonylene groups, various decylene groups, various undecylene groups, various dodecylene groups, various tridecylene groups, various tetradecylene groups, various pentadecylene groups, various hexadecylene groups, various heptadecylene groups, various octadecylene groups, various nonadecylene groups, and various eicosylene groups.

The monovalent organic groups $R^{13}$ and $R^{14}$ can be exemplified by an alkyl group, an alkenyl group, a cycloalkyl group, an aryl group, and an arylalkyl group. An aromatic hydrocarbon group such as an aryl group or an arylalkyl group is preferred, and an aryl group is more preferred. A phenyl group is especially preferred as the monovalent organic group $R^{13}$, $R^{14}$.

The number of carbon atoms of the aryl group is preferably not less than 6, and the upper limit is preferably 20 or less, more preferably 12 or less, and even more preferably 10 or less. Examples of the aryl group include a phenyl group, various methylphenyl groups, various ethylphenyl groups, various dimethylphenyl groups, various propylphenyl groups, various trimethylphenyl groups, various butylphenyl groups, and various naphthyl groups. The number of carbon atoms of the arylalkyl group is preferably not less than 7, and the upper limit is preferably 20 or less, more preferably 12 or less, and even more preferably 10 or less. Examples of the arylalkyl group include a benzyl group, a phenethyl group, various phenylpropyl groups, various phenylbutyl groups, various methylbenzyl groups, various ethylbenzyl groups, various propylbenzyl groups, various butylbenzyl groups, and various hexylbenzyl groups.

The monovalent organic group $R^{15}$ can be exemplified by an alkyl group, an alkenyl group, a cycloalkyl group, an aryl group, and an arylalkyl group. An aliphatic hydrocarbon group such as an alkyl group or an alkenyl group is preferred, and an alkyl group is more preferred. Thus, $R^{12}$ is preferably an alkyl ester group or an alkenyl ester group, and more preferably an alkyl ester group.

The number of carbon atoms of the alkyl group is preferably not less than 1, more preferably not less than 2, and even more preferably not less than 6, and the upper limit is preferably 20 or less, more preferably 16 or less, and even more preferably 12 or less. Examples of the alkyl group include a methyl group, an ethyl group, various propyl groups, various butyl groups, various pentyl groups, various hexyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups, various nonadecyl groups, and various eicosyl groups.

The number of carbon atoms of the alkenyl group is preferably not less than 2, more preferably not less than 3, and even more preferably not less than 6, and the upper limit is preferably 20 or less, more preferably 16 or less, and even more preferably 12 or less. Examples of the alkenyl group include a vinyl group, various propenyl groups, various butenyl groups, various pentenyl groups, various hexenyl groups, various octenyl groups, various nonenyl groups, various decenyl groups, various undecenyl groups, various dodecenyl groups, various tridecenyl group, various tetradecenyl groups, various pentadecenyl groups, various hexadecenyl groups, various heptadecenyl groups, various octadecenyl groups, various nonadecenyl groups, and various eicosenyl groups.

Among hydroxyphenyl triazine compounds as represented by the general formula (1), a hydroxyphenyl triazine compound, in which $R^{11}$ is an alkylene group having 1 to 20 carbon atoms, $R^{12}$ is an alkyl ester group in which the alkyl group $R^{15}$ has 1 to 20 carbon atoms, $R^{13}$ and $R^{14}$ are each an aryl group having 6 to 20 carbon atoms, and $n_{11}$ and $n_{12}$ are each 1, is preferred; a hydroxyphenyl triazine compound, in which $R^{11}$ is an alkylene group having 1 to 12 carbon atoms, $R^{12}$ is an alkyl ester group in which the alkyl group $R^{15}$ has 2 to 16 carbon atoms, $R^{13}$ and $R^{14}$ are each an aryl group having 6 to 12 carbon atoms, and $n_{11}$ and $n_{12}$ are each 1, is more preferred; a hydroxyphenyl triazine compound, in which $R^{11}$ is an alkylene group having 1 to 8 carbon atoms, $R^{12}$ is an alkyl ester group in which the alkyl group $R^{15}$ has 6 to 12 carbon atoms, $R^{13}$ and $R^{14}$ are each an aryl group having 6 to 10 carbon atoms, and $n_{11}$ and $n_{12}$ are each 1, is even more preferred; and a hydroxyphenyl triazine compound, in which $R^{11}$ is an alkylene group having 1 to 4 carbon atoms, $R^{12}$ is an alkyl ester group in which the alkyl group $R^{15}$ has 8 carbon atoms, $R^{13}$ and $R^{14}$ are each a phenyl group, and $n_{11}$ and $n_{12}$ are each 1, is especially preferred.

In particular, among hydroxyphenyl triazine compounds as represented by the general formula (1), a hydroxyphenyl triazine compound, in which $R^{11}$ is an ethylene group, $R^{12}$ is an ester group in which $R^{15}$ is an isooctyl group, $R^{13}$ and $R^{14}$ are each a phenyl group, and $n_{11}$ and $n_{12}$ are each 1, namely 2-(2-hydroxy-4-[1-octyloxycarbonylethoxy]phenyl)-4,6-bis(4-phenylphenyl)-1,3,5-triazine, represented by the following chemical formula (2), is preferred. The hydroxyphenyl triazine compound is, for example, available as a commercial product ("TINUVIN 479", manufactured by BASF SE).

The triazine ultraviolet absorber may be used singly or in combination of two or more.

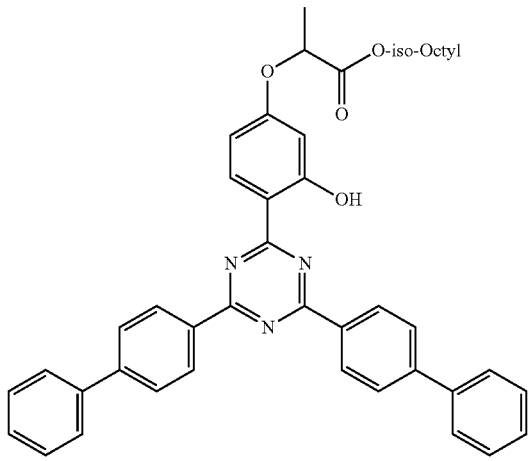

(2)

Examples of the cyanoacrylate ultraviolet absorber include 2-ethyl-hexyl-2-cyano-3,3-diphenyl acrylate, ethyl-2-cyano-3,3-diphenyl acrylate, and octyl-2-cyano-3,3-diphenyl acrylate. These compounds may have a functional group such as a vinyl group or an allyl group. These cyanoacrylate ultraviolet absorbers may be used singly or in a combination of two or more.

Examples of the benzotriazole ultraviolet absorber include
2-(2-hydroxy-5-methylphenyl)benzotriazole,
2-(2-hydroxy-3,5-di-tert-amylphenyl)benzotriazole, and
3-[3-(benzotriazole-2-yl)-5-tert-butyl-4-hydroxyphenyl] propionate ester of polyethylene glycol. These compounds may have a functional group such as a (meth) acryloyl group, a vinyl group or an allyl group. These benzotriazole ultraviolet absorbers may be used singly or in a combination of two or more.

Examples of the benzophenone ultraviolet absorber include
2,4-dihydroxybenzophenone, 2-hydroxy-4-methoxybenzophenone,
2-hydroxy-4-octyloxybenzophenone, 2-hydroxy-4-dodecyloxybenzophenone,
2-hydroxy-4-benzyloxybenzophenone,
2-hydroxy-4-(2-hydroxy-3-mechacryloxypropoxy) benzophenone,
2-hydroxy-4-methoxy-5-sulfobenzophenone,
2-hydroxy-4-methoxy-5-sulfobenzophenone trihydrate,
2-hydroxy-4-methoxy-2'-carboxybenzophenone,
2-hydroxy-4-octadecyloxybenzophenone,
2-hydroxy-4-diethylamino-2'-hexyloxycarbonylbenzophenone,
2,2'-dihydroxy-4-methoxybenzophenone, 2,2',4,4'-tetrahydroxybenzophenone,
2,2'-dihydroxy-4,4'-dimethoxybenzophenone, and
1,4-bis(4-benzyloxy-3-hydroxyphenoxy)butane. These benzophenone ultraviolet absorbers may be used singly or in a combination of two or more.

The content of the ultraviolet absorber in the surface protective layer is preferably not less than 0.1 parts by mass, more preferably not less than 0.5 parts by mass, and even more preferably not less than 1 part by mass based on 100 parts by mass of the resin constituting the substrate. The content of the ultraviolet absorber in the substrate is preferably not more than 10 parts by mass, more preferably not more than 8 parts by mass, and even more preferably not more than 5 parts by mass based on 100 parts by mass of the resin constituting the substrate. The use of the ultraviolet absorber in an amount within the above range can achieve superior weatherability without bleeding of the ultraviolet absorber and can prevent yellowing of the surface protective layer.

Besides the ultraviolet absorber, the surface protective layer may optionally contain other additive(s). Examples of such additives include a light stabilizer, an abrasion-resistance enhancer, a polymerization accelerator, a polymerization inhibitor, a crosslinking agent, an infrared absorber, an antistatic agent, an adhesion improver, a levelling agent, a thixotropy-imparting agent, a coupling agent, a plasticizer, a defoamer, a solvent, and a colorant. The use of a weathering stabilizer such as a light stabilizer is preferred to achieve superior weatherability. The above additives may be used singly or in a combination of two or more.

The light stabilizer can be selected from the light stabilizers exemplified above as being usable for the substrate, and the benzotriazole ultraviolet absorber can be preferably used also for the substrate.

In order to enhance the weatherability, and also enhance the processing characteristics and the scratch resistance, the thickness of the surface protective layer is preferably not less than 1.5 µm, more preferably not less than 2 µm, and even more preferably not less than 3 µm. The thickness of the surface protective layer is preferably riot more than 20 µm, more preferably not more than 15 µm, and even more preferably not more than 10 µm.

Backing Substrate

As shown in FIG. 3, the decorative sheet of the present invention can include a backing substrate 3, the substrate 1, and the surface protective layer 2, disposed in this order. The backing substrate can be optionally provided, for example, to reinforce the decorative sheet, to enhance adhesion to an adherent, and/or to impart masking properties to the decorative sheet, and is suitable especially when the above-described substrate is a coated film.

A resin sheet, paper, a non-woven fabric, a woven fabric, a metal foil, or the like can be used as the backing substrate. An acrylic resin, a polyester resin, a polyolefin resin, an ABS resin, or the like can be used as the resin sheet. In view of easily adjusting the water vapor transmission rate, a polyolefin resin and a vinyl chloride resin are preferred, and a polyolefin resin is more preferred.

The polyolefin resin can also preferably use from the polyethylene resins and the polypropylene resins described as specific examples of the above resins constituting the substrate.

When a vinyl chloride resin is used as the transparent resin layer, the vinyl chloride resins described as specific examples of the above resins constituting the substrate can be preferably used.

While the thickness of the backing substrate may be appropriately determined depending on the purpose, it is preferably not less than 10 µm and not more than 500 µm, more preferably not less than 15 µand not more than 200 µm, and even more preferably not less than 20 µm and not more than 100 µm.

Decorative Layer

In order to enhance the design, the decorative sheet of the present invention may include a decorative layer 4 between the substrate 1 and the surface protective layer 2, as shown in FIG. 2.

The decorative layer may be, for example, a colored layer formed by coating the entire surface (so-called solid colored layer), or a picture layer formed by printing a pattern by using an ink(s) and a printer, or may be a combination thereof. For example, when it is intended to mask the color of an adherend, the use of a solid colored layer can enhance the design while coloring and masking the adherend, hence preferred. In order to further enhance the design, it is possible to use a combination of a solid colored layer and a picture layer. On the other hand, when it is intended to make use of the design or pattern of an adherend, only a picture layer may be provided.

A mixture of a binder with an additive(s), such as a colorant, e.g. a pigment or a dye, an extender pigment, a solvent, a stabilizer, a plasticizer, a catalyst, a curing agent, an ultraviolet absorber, a light stabilizer, etc., can be used as an ink for the decorative layer.

There is no particular limitation on the binder. Examples of usable binders include a polyurethane resin, a vinyl chloride-vinyl acetate copolymer resin, a vinyl chloride-vinyl acetate-acrylate copolymer resin, a chlorinated propylene resin, an acrylic resin, a polyester resin, a polyamide resin, a butyral resin, a polystyrene resin, a nitrocellulose resin, and a cellulose acetate resin. These resins may be used singly or as a mixture of two or more. Among them, a polyurethane resin is especially preferred.

Examples of usable colorants include an inorganic pigment such as carbon black, iron black, titanium white, antimony white, chrome yellow, titanium yellow, red iron oxide, cadmium red, ultramarine blue, or cobalt blue; an organic pigment or dye such as quinacridone red, isoindolinone yellow, or phthalocyanine blue; a metal pigment such as scaly foil pieces of aluminum, brass, or the like; and a pearlescent (pearl) pigment such as scaly foil pieces of titanium dioxide-coated mica, basic lead carbonate, or the like. When titanium white is used as the colorant, it is preferred to use the same white pigment particles as used in the substrate in order to enhance dispersion and weatherability.

While the thickness of the decorative layer may be appropriately selected depending on the intended picture, it is preferably not less than 0.5 µm and not more than 20 µm, more preferably not less than 1 µm and not more than 10 µm, and even more preferably not less than 2 µm and not more than 5 µm in order to mask the color of an adherend and enhance the design.

Adhesive Layer A

The decorative sheet of the present invention may include an adhesive layer. Especially when the decorative layer is provided between the substrate and the surface protective layer, an adhesive layer A is preferably provided for adhesion of the decorative layer to the surface protective layer, or the decorative layer to the transparent resin layer.

When there is another decorative layer between the substrate and the transparent resin layer, there is no particular limitation on the positional relation between the adhesive layer A and the decorative layer. More specifically, the decorative layer, the adhesive layer A and the transparent resin layer may he disposed in this order from the side closer to the substrate, or the adhesive layer A, the decorative layer, and the transparent resin layer may be disposed in this order from the side closer to the substrate.

The adhesive layer A can be composed of adhesives such as a urethane adhesive, an acrylic adhesive, an epoxy adhesive, and a rubber adhesive. Among these adhesives, a urethane adhesive is preferred for its adhesive strength.

Examples of the urethane adhesive include an adhesive utilizing a two-component curable urethane resin containing various polyol compounds such as polyether polyols, polyester polyols, and acrylic polyols and a curing agent such as an isocyanate compound.

The thickness of the adhesive layer A is preferably not less than 0.1 μm and not more than 30 μm, more preferably not less than 1 μm and not more than 15 μm, and even more preferably not less than 2 μm and not more than 10 μm.

The above-described decorative layer, adhesive layer A, primer layer, and top coat layer can be formed by applying a coating solution containing a composition for forming each layer by a known method such as a gravure printing method, a bar coating method, a roll coating method, a reverse roll coating method, or a comma coating method, and optionally drying and curing.

Transparent Resin Layer

The decorative sheet of the present invention may include a transparent resin layer. Especially in order to protect the decorative layer, the transparent resin layer can be provided on the decorative layer either directly or via another layer such as an adhesive layer, and there may be the transparent resin layer between the substrate and the surface protective layer.

Examples of preferable resins for the transparent resin layer include a polyolefin resin, a polyester resin, an acrylic resin, a polycarbonate resin, a polyurethane resin, a polystyrene resin, a vinyl chloride resin, and a vinyl acetate resin. Among them, in order to enhance the weatherability and the surface properties such as scratch resistance, a polyolefin resin and a polyester resin are preferred, and a polyolefin resin is more preferred. The polyolefin resin can be exemplified by the resins described as being usable for the resin substrate. Among them, a polypropylene resin is preferred. In view of easily adjusting the water vapor transmission rate, a polyolefin resin and a vinyl chloride resin are preferred, and a polyolefin resin is more preferred.

The polyolefin resin can also preferably use from the polyethylene resins and the polypropylene resins described as specific examples of the above resins constituting the plastic of the substrate.

When a vinyl chloride resin is used as the transparent resin layer, the vinyl chloride resins described as specific examples of the above resins constituting the plastic of the substrate can be preferably used.

The transparent resin layer may optionally contain an additive. The additive can be exemplified by the additives described above as being usable for the substrate. Among such additives, a weathering stabilizer such as an ultraviolet absorber or a light stabilizer is preferably used. The ultraviolet absorber is preferably selected from the ultraviolet absorbers exemplified above as being usable for the surface protective layer, and the light stabilizer is preferably selected from the light stabilizers exemplified above as being usable for the substrate. There is no particular limitation on the amount of the additive, and it may be appropriately set depending on the required properties, etc.

The thickness of the transparent resin layer is preferably not less than 10 μm and not more than 150 μm, more preferably not less than 30 μm and not more than 120 μm, and even more preferably not less than 50 μm and not more than 100 μm in order to enhance the weatherability, further the processing characteristics, the scratch resistance, and protect the decorative layer and make handling of the decorative sheet easier.

One or both surfaces of the transparent resin layer may be subjected to a physical or chemical surface treatment, e.g. by an oxidation method or a surface roughening method, for example to enhance the interlayer adhesion between the transparent resin layer and another layer(s). The surface treatment method may be appropriately selected depending on the type of the resin to be treated; however, in general, a corona discharge treatment method is preferably used from the viewpoint of the effect, the operability, etc.

Further, in order to enhance the interlayer adhesion between the transparent resin layer and another layer(s), one or both surfaces of the transparent resin layer may be subjected to processing e.g. to form a primer layer.

Primer Layer

The decorative sheet of the present invention may include a primer layer. When the primer layer is provided, it is preferably disposed between the decorative layer and the surface protective layer. The provision of the primer layer can enhance the adhesion between the decorative layer and the surface protective layer and, in addition, can relax stress in the surface protective layer. This makes it possible to prevent cracking of the surface protective layer due to deterioration of the weatherability of the layer, and to significantly enhance the durability.

A resin for the primer layer can be exemplified by the resins described above as binders usable for the decorative layer. Such resins can be used singly or in a combination of two or more. For example, an acrylic-urethane resin or a mixture of a polycarbonate urethane-acrylate copolymer and an acrylic polyol resin can be used as the resin. The primer layer can be formed of a resin composition which is a mixture of the resin with an additive(s), such as a solvent, a stabilizer, a plasticizer, a catalyst, a curing agent, an ultraviolet absorber, a light stabilizer, etc.

In order to enhance the adhesiveness, the thickness of the primer layer is preferably not less than 0.1 μm and not more than 10 μm, more preferably not less than 0.5 μm and not more than 8 μm, and even more preferably not less than 1 μm and not more than 6 μm.

Decorative Sheet Production Method

The decorative sheet production method of the present invention will now be described with reference to a decorative sheet which includes a substrate, a decorative layer, an adhesive layer, a transparent resin layer, a primer layer, and a surface protective layer in this order according to a preferred embodiment. of the present invention.

The decorative sheet of the present invention can be produced, for example, through the sequential steps of: forming a decorative layer on a substrate; forming an adhesive layer, a transparent resin layer and a primer layer on the decorative layer; and applying a curable resin composition onto the primer layer, followed by curing to form a surface protective layer.

The step of forming the decorative layer on the substrate is performed by applying an ink(s), to be used for the formation of the decorative layer, onto the substrate containing the white pigment particles, thereby forming the intended colored layer and/or the intended picture layer. The application of the ink(s) is performed by a known method such as a gravure printing method, a bar coating method, a roll coating method, a reverse roll coating method, or a comma coating method, preferably by a gravure printing method.

In the step of forming the adhesive layer, the transparent resin layer and the primer layer on the decorative layer, an adhesive is first applied onto the decorative layer on the substrate to form the adhesive layer. Subsequently, using a resin composition which is to constitute the transparent resin layer, the transparent resin layer is pressed against and adhered to the adhesive layer by a method such as extrusion lamination, dry lamination, wet lamination, or thermal lamination, thereby laminating the transparent resin layer to the adhesive layer. Thereafter, a resin composition, which is to constitute the primer layer, is applied onto the transparent resin layer by a known method such as such as a gravure printing method, a bar coating method, a roll coating method, a reverse roll coating method, or a comma coating method, thereby forming the primer layer.

The step of forming the surface protective layer is performed by applying a curable resin composition containing an ultraviolet absorber onto the primer layer, and then curing the resin composition.

The application of the resin composition is preferably performed by a known method such as gravure coating, bar coating, roll coating, reverse roll coating, or comma coating, more preferably by gravure coating in such a manner that the surface protective layer after curing has a predetermined thickness.

When an ionizing radiation-curable resin composition is used for the formation of the surface protective layer, an uncured resin layer, formed by coating of the resin composition, becomes the surface protective layer by irradiating the uncured resin with ionizing radiation, such as an electron beam or ultraviolet light, to cure the resin layer. When an electron beam is used as the ionizing radiation, the acceleration voltage may be appropriately selected depending on the type of the resin used and the thickness of the layer. However, it is generally preferred to cure the uncured resin layer at an acceleration voltage of about not less than 70 kV and not more than 300 kV.

The exposure dose is preferably at a level at which the crosslinking density of the ionizing radiation-curable resin becomes saturated, and is generally selected within the range of not less than 5 kGy and not more than. 300 kGy (not less than 0.5 Mrad and not more than 30 Mrad), preferably within the range of not less than 10 and not more than 50 kGy (not less than 1 Mrad and not more than 5 Mrad).

There is no particular limitation on the electron beam source; various electron beam accelerators, such as a Cockloft-Walton type, a van de Graaff type, a resonance transformer type, an insulated core transformer type, a linear type, a Dynamitron type, and a high-frequency type, can be used.

The above-described decorative layer, adhesive layer A, primer layer, and surface protective layer can be formed by applying a coating solution containing a composition for forming each layer by a known method such as a gravure printing method, a bar coating method, a roll coating method, a reverse roll coating method, or a comma coating method, and optionally drying and curing.

The decorative sheet may be imparted (also referred to as forming) with an intended roughening shape (also referred to as roughening pattern) by embossing.

When the embossing is performed, the decorative sheet is heated to, for example, preferably not less than 80° C. and not more than 260° C., more preferably not less than 85° C. and not more than 160° C., and even more preferably not less than 100° C. and not more than 140° C., and an embossed plate is pressed against the decorative sheet to perform the embossing. It is preferred to press the embossed plate at the surface-protective-layer side of the decorative sheet.

Decorative Material

The decorative material of the present invention includes an adherend and the above-described decorative sheet. More specifically, the decorative material of the present invention is, as shown. in FIG. 4, a laminate of the adherend and the decorative sheet, in which the adherend 20 faces the substrate-side surface of the decorative sheet 10, and may have an adhesive layer B 8.

Adherend

The adherend can be exemplified by plates, such as flat plates or curved plates, made of a variety of materials, an article having a three-dimensional shape, and a sheet (or a film). Specific examples thereof may include a wood member, for use as a plate material or as an article having a three-dimensional shape, made of a single wood. plate made of a variety of woods such as Japanese cedar, Japanese cypress, pine, lauan, a plywood plate, a particle board, a wood fiberboard, e.g. an MDF (medium-density fiberboard), etc.; a metal member, for use as a plate material, as an article having a three-dimensional shape, or as a sheet, made of iron or an iron alloy such as carbon steel, aluminum or an aluminum alloy such as duralumin, copper or a copper alloy such as brass, titanium, etc.; a ceramic member, for use as a plate member or as an article having a three-dimensional shape, made of glass, ceramics such as pottery, a non-cement ceramic material such as gypsum, a non-pottery ceramic material such as ALC (autoclaved lightweight concrete), etc.; and a resin member, for use as a plate, as an article having a three-dimensional shape or as a sheet, e.g., made of an acrylic resin, a polyester resin, a polystyrene resin, a polyolefin resin such as polypropylene, an ABS (acrylonitrile-butadiene-styrene copolymer) resin, a phenol resin, a vinyl chloride resin, a cellulose resin, a rubber, etc. These members can be used singly or in a combination of two or more.

The adherend may be appropriately selected from the above members depending on the intended use. When the decorative material is used for an interior member of an architectural structure such as a wall, a ceiling, or a floor; for an exterior member such as an outer wall, a roof, an eaves soffit, a railing, or a gate; or for fittings or a fixture member such as a window frame, a door, a handrail, a skirting board, a crown molding, or a cable cover, the adherend is preferably including at least one member selected from a wood member, a metal member, and a resin member. When the decorative material is used for an exterior member such as a front door, a gate, a roofing material, a railing, or a fence; or for fittings such as a window frame or a door, the adherend preferably includes at least one member selected from a metal member and a resin member.

While the thickness of the adherend may be appropriately selected depending on the intended use and the material, it is preferably not less than 0.1 mm and not more than 10 mm, more preferably not less than 0.3 mm and not more than 5 mm, and even more preferably not less than 0.5 mm and not more than 3 mm.

Adhesive Layer B

In order to obtain excellent adhesion between the adherend and the decorative sheet, they are preferably attached to each other via an adhesive layer. Thus, the decorative material of the present invention preferably is a member including at least the adherend, the adhesive layer, the substrate, and the surface protective layer in this order.

There is no particular limitation on the adhesive used for the adhesive layer B, and a known adhesive can be used and appropriately selected depending on the intended use. Examples preferably include adhesives such as a moisture curing adhesive, an anaerobic curing adhesive, a dry curing adhesive, a UV curing adhesive, a heat-sensitive adhesive (e.g. hot-melt adhesive), and a pressure-sensitive adhesive. A moisture curing adhesive and a heat-sensitive adhesive are preferred in order to enhance the compatibility with the decorative material of the present embodiment having the predetermined moisture vapor transmission rate, the handleability, and the like. A moisture curing and heat-sensitive adhesive are more preferred.

A heat-sensitive adhesive is preferred because an adhesive strength rises to a saturation at the same time as a melted liquid adhesive layer is cooled and solidified.

The decorative material of the present embodiment has a water vapor transmission rate of not less than $0.75 \ g/m^2 \cdot 24$ h. For this reason, a moisture curing adhesive can contact an appropriate moisture in the application process, easily increasing an initial tight contact strength of the adhesive used for the adhesive layer. The decorative material of the present embodiment has a water vapor transmission rate of not more than $45 \ g/m^2 \cdot 24$ h. For this reason, a moisture curing adhesive does not contact an excess moisture and the decrease in adhesion caused by the degradation associated with the hydrolysis of the moisture curing adhesion can be prevented. As a result, excellent long-term adhesion and the application suitability are easily obtained. A moisture curing adhesive is also preferred for its handleability.

Examples of resins which are usable for these adhesives include an acrylic resin, a urethane resin, a vinyl chloride resin, a vinyl acetate resin, a vinyl chloride-vinyl acetate copolymer, a styrene-acrylate copolymer, a polyester resin, an amide resin, a cyanoacrylate resin, and an epoxy resin. These resins can be used singly or in a combination of two or more. A two-component curable urethane or ester adhesive, using a curing agent such as an isocyanate compound, can also be used.

A gluing agent may also be used for the adhesive layer. An acrylic, urethane, silicone or rubber gluing agent can be appropriately selected and used.

A moisture curing adhesive, which is one of the adhesives preferably used in the present embodiment and has the resin base of a urethane resin, has a prepolymer having an isocyanate group at a molecular end as the essential component. Such a prepolymer is generally a polyisocyanate prepolymer, which has 1 or more isocyanate groups at both molecular ends and is a solid thermoplastic resin at room temperature. Examples of such a polyisocyanate prepolymer include a polyisocyanate prepolymer using a crystalline solid polyester polyol at room temperature as the polyol component and polyisocyanate including 4,4-diphenylmethane diisocyanate or tolylene diisocyanate as the polyisocyanate component.

The adhesive layer B can be formed by applying and drying the above resin in an applicable form, such as a solution or an emulsion, by a method such as a gravure printing method, a screen printing method, or a reverse coating method using a gravure plate.

While there is no particular limitation on the thickness of the adhesive layer B, it is preferably not less than 1 μm and not more than 100 μm, more preferably not less than 5 μm and not more than 50 μm, and even more preferably not less than 10 μm and not more than 30 μm in order to obtain excellent adhesiveness.

Decorative Material Production Method

The decorative material can be produced through a process of laminating the decorative sheet and an adherend together.

The process involves laminating an adherend and the decorative sheet of the present invention, with the surface of the adherend that requires decoration facing the substrate-side surface of the decorative sheet. The process can be preferably performed, for example, by the following methods: a lamination method which involves pressing the decorative sheet against a plate-like adherend via an adhesive by using a pressure roller; a wrapping method which involves pressing the decorative sheet against a plurality of side surfaces, constituting an adherend, via an adhesive sequentially by using a plurality of rollers in different directions while supplying the decorative sheet; and a vacuum forming method which involves heating the decorative sheet, fixed in a fixing frame, with a heater via a silicone rubber sheet to a predetermined temperature at which the decorative sheet softens, and pressing a vacuum forming mold against the heated and softened decorative sheet while sucking air from the vacuum forming mold e.g. with a vacuum pump, thereby bringing the decorative sheet into tight contact with the vacuum forming mold.

When a hot-melt adhesive (heat-sensitive adhesive) is used in the lamination method or the wrapping method, the heating temperature is preferably riot less than 160° C. and not more than 200° C., though it may vary depending on the type of the resin constituting the adhesive. In the case of using a reactive hot-melt adhesive, the heating temperature is preferably not less than 100° C. and not more than 130° C. When the lamination process is performed by the vacuum forming method, the process is generally carried out while heating the decorative sheet and the adherend preferably at a temperature of not less than 80° C. and not more than 130° C., more preferably at a temperature of not less than 90° C. and not more than 120° C.

In the embodiment illustrated in FIG. 1, the decorative sheet 10 had the laminate structure of the following (1), however, various forms of laminate structures can be selected depending on the intended use and required performance as long as the decorative sheet has at least the surface protective layer defined by the present invention described above on the substrate. Examples of other specific laminate structures of the decorative sheet of the present invention include the following laminate structures of (2) to (10).

(1) Substrate 1/surface protective layer 2
(2) Substrate 1/decorative layer 4/transparent resin layer 5/primer layer 6/surface protective layer 2
(3) Substrate 1/primer layer 6/surface protective layer 2
(4) Substrate 1/transparent resin layer 5/surface protective layer 2
(5) Substrate 1/decorative layer 4/surface protective layer 2
(6) Substrate 1/transparent resin layer 5/decorative layer 4/surface protective layer 2
(7) Substrate 1/transparent resin layer 5/decorative layer 4/ primer layer 6/surface protective layer 2
(8) Backing substrate 3/substrate 1/decorative layer 4/transparent resin layer 5/primer layer 6/surface protective layer 2
(9) Backing substrate 3/substrate 1/transparent resin layer 5/decorative layer 4/surface protective layer 2
(10) Backing substrate 3/substrate 1/transparent resin layer 5/decorative layer 4/primer layer 6/surface protective layer 2

In the above (1) to (10), a known adhesive layer (the above adhesive layer A) may be interjacent between the substrate and the transparent resin layer and/or the decorative layer. In the above (1), (3) to (5), and (10), a known adhesive layer (the above adhesive layer A) may be interjacent between the substrate and the transparent resin layer and/or the decorative layer, or roughening shapes such as wood grain duct, sand texture, satin texture, hair line, and leather grain may be formed on the surface of the substrate, the transparent resin layer, etc., using the embossing or other known various techniques.

In the present paragraph, the "/" means the interface of each layer.

Application

The thus-obtained decorative material may be arbitrarily cut, and the front or end surface(s) may be subjected to decoration processing, such as grooving or chamfering, by using a cutting machine such as a router or a cutter. Further, after attaching (laminating) the decorative sheet to a steel plate or the like, the decorative material may be subjected to bending such as V-cutting or wrapping. The decorative material finds a variety of applications including: an interior material or an exterior member of an architectural structure such as a wall, a ceiling, a floor, or a front door; fittings or a fixture member such as a window frame, a door, a handrail, a skirting board, a crown molding, or a cable cover; a surface decorative plate for a kitchen or furniture or for a cabinet of a light electrical appliance, an OA instrument, etc.; and an interior material or an exterior member of a vehicle.

Examples

The following examples illustrate the present invention in greater detail and are not intended to limit the scope of the invention.

1. Evaluation and Measurement Method 1-1, Evaluation of Weatherability

For the decorative sheets obtained in Examples and Comparative Examples, a weather resistance test was performed with a sunshine weatherometer ("WEL-300", manufactured by Suga Test Instruments Co., Ltd.) by allowing each decorative sheet to stand for 6,000 hours under the conditions of 18-minute rainfall per 120 minutes at a black panel temperature of 63° C. The appearance of each decorative material after the weather resistance test was visually observed, and evaluated by the following criteria:
A: no significant change in appearance was observed (Pass)
B: a small crack was observed in the substrate (Pass)
C: a large crack in the substrate and/or an abnormality such as delamination or non-adhesion portion between the substrate and the surface protective layer was observed (Failure)

1-2. Evaluation of Dispersion

Cross-sections of the decorative sheets obtained in Examples and Comparative Examples in the thickness direction were observed with a scanning electron microscope (SEM). Dispersion of white pigment particles in the substrate was visually observed, and evaluated by the following criteria:
A: uniform dispersion of white pigment particles was observed (Pass).
B: non-uniform dispersion of white pigment particles as well as partial agglomeration. of the particles were observed. (Failure).

1-3. Measurement of Water Vapor Transmission Rate

The water vapor transmission rate was measured on the decorative sheets obtained in Examples and Comparative Examples in accordance with Testing Methods for Determination of the Water Vapor Transmission Rate of Moisture-Proof Packaging Materials (Dish Method) defined in JIS Z0208:1976.

1-4. Evaluation of Application Suitability

The decorative sheet obtained in Examples and Comparative Examples and a flat plate-shaped adherend (material: polyvinyl chloride (PVC)) having a width of 25 mm were attached (laminated) via an adhesive layer having a thickness of 50 µm obtained by melting a moisture curing and hot-melt urethane resin adhesive (a polyurethane prepolymer having an isocyanate group in the molecule, "1308.20 (product name)", manufactured by TAIGA) at 120° C. The adhesive layer of the obtained laminate was cooled and solidified at room temperature of 23° C., allowed to stand for 1 hour under environment of 90° C. to prepare a sample. The sample was subjected to a peeling test under temperature environment of 25° C. using a TENSILON Universal Material Testing Instrument ("TENSILON RTC-1250A (product name)", manufactured by ORIENTEC CORPORATION) under the conditions of a tensile speed: 10 mm/min, a peeling direction: 90°, and a distance between chucks: 30 mm. A peel strength was measured as the initial adhesive strength, and the evaluations were made by the following criteria. The evaluation of B or higher is a Pass for the application suitability.
A: peel strength was 1.0 N/mm or more (Pass).
B: peel strength was 0.5 N/mm or more and less than 1.0 N/mm (Pass).
C: peel strength was less than 0.5 N/mm (Failure).

1-5. Evaluation of Long-term Adhesion.

The sample prepared in the above "1-4. Evaluation of Application Suitability" was allowed to stand for 6 weeks under heat and humidity environment of 70° C. 90% RH, then subjected to a peeling test under temperature environment of 25° C. using a TENSILON Universal Material Testing Instrument ("TENSILON RTC-1250A (product name)", manufactured by ORIENTEC CORPORATION) under the conditions of a tensile speed: 50 mm/min and a peeling direction: 90°, and a peel strength was measured and evaluated by the following criteria. The evaluation of B or higher is a Pass for the long-term adhesion.

A: peel strength of 2.0 N/mm or more (Pass).
B: peel strength of 1.0 N/mm or more and less than 2.0 N/mm (Pass).
C: peel strength of less than 1.0 N/mm (Failure).

1-6. Evaluation of Processing Suitability

When the sample was prepared in the above "1-4. Evaluation of Application Suitability", occurrence of a non-adhesion portion of the decorative material was visually observed at a bending part (bending angle: 1 mmR) during the attachment (lamination) and evaluated by the following criteria. The evaluation of B or higher is a Pass for the processing suitability.

A: No non-adhesion was observed at all (Pass)
B: Almost no non-adhesion was Observed (Pass)
C: Non-adhesion was observed and delaminated (Failure)

Example 1

Example 1 will be described using FIG. 2.

An 80 μm thick polypropylene sheet (this is also referred to as "polyolefin") containing white pigment particles, which were titanium oxide particles having a coating containing Al element and Si element, and bis(1-undecanoxy-2,2,6,6-tetramethyl piperidine-4-yl) carbonate as a hindered amine light stabilizer in an amount of 3 parts by mass based on 100 parts by mass of the resin was used as a substrate 1. The Ti:Al:Si mass ratio in the white pigment particles was 1:0.05:0.003, the content of the white pigment particles in the substrate was 10% by mass, and the average particle diameter of the primary particles of the white pigment particles was 0.26 μm.

After performing a corona discharge treatment on both surfaces of the substrate 1, gravure printing was performed on one surface of the substrate 1 using a printing ink containing an acrylic-urethane resin, thereby forming a decorative layer 4.

Subsequently, a urethane resin adhesive was applied onto the decorative layer 4 such that the thickness of the adhesive after drying became 3 μm, thereby forming a transparent adhesive layer A 7.

Subsequently, a polypropylene resin was melt-extruded by a T-die extruder onto the adhesive layer to form a transparent resin layer 5 of polypropylene having a thickness of 80 μm.

After performing a corona discharge treatment on the surface of the transparent resin layer 5, a coating solution containing a resin composition having a resin component containing a polycarbonate urethane-acrylate copolymer and an acrylic polyol was applied to the surface of the transparent resin layer in an amount of 4 g/m$^2$ to form a primer layer 6 having a thickness of about 4 μm.

Lastly, an ionizing radiation-curable resin composition, containing 100 parts by mass of a trifunctional urethane acrylate oligomer having a weight-average molecular weight of about 5000, and 4 parts by mass of 2-(2-hydroxy-4-[1-octyloxycarbonylethoxy]phenyl)-4,6-bis(4-phenylphenyl)-1,3,5-triazine as a triazine ultraviolet absorber, was applied onto the primer layer by a gravure coating method to form a coating. Thereafter, the coating was irradiated with an electron beam under the conditions of 175 keV and 5 Mrad (50 kGy) to crosslink and cure the coating, thereby forming a surface protective layer 2 (5 g/m$^2$) having a thickness of 5 μm and obtaining a decorative sheet.

The above evaluations were performed. on the decorative sheet obtained. The evaluation results are shown in Table 1 below.

Examples 2 and 3, and Comparative Examples 1 and 2

A decorative sheet was produced in the same manner as in Example 1 except for using, instead of the white pigment particles used in Example 1, white pigment particles which were coated titanium oxide particles having a Ti:Al:Si mass ratio shown in Table 1. The above evaluations were performed on the decorative sheet obtained. The evaluation results are shown in Table 1 below.

TABLE 1

|  |  | Example | | | Comparative Example | |
| --- | --- | --- | --- | --- | --- | --- |
|  |  | 1 | 2 | 3 | 1 | 2 |
| White pigment particles Ti:Al:Si mass ratio (Ti = 1) | Al | 0.05 | 0.06 | 0.10 | 0.04 | 0.20 |
|  | Si | 0.003 | 0.006 | 0.040 | 0.002 | 0.070 |
| Substrate | Material | Polyolefin | Polyolefin | Polyolefin | Polyolefin | Polyolefin |
|  | Thickness | 80 μm | 80 μm | 80 μm | 80 μm | 80 μm |
|  | Degree of crystallinity | 70% | 70% | 70% | 70% | 70% |
| Transparent resin layer | Material | Polyolefin | Polyolefin | Polyolefin | Polyolefin | Polyolefin |
|  | Thickness | 80 μm | 80 μm | 80 μm | 80 μm | 80 μm |
|  | Degree of crystallinity | 70% | 70% | 70% | 70% | 70% |
| Weatherability |  | B | A | B | C | B |
| Dispersion |  | A | A | A | A | B |
| Water vapor transmission rate (g/m$^2$ · 24 h) |  | 1.5 | 1.5 | 1.5 | 1.5 | 1.5 |
| Application suitability |  | B | B | B | B | B |
| Long-term adhesion |  | A | A | A | A | A |
| Processing suitability |  | A | A | A | A | A |

Examples 4 to 6, Comparative Examples 3 and 4

The decorative materials and the decorative members of Examples 4 to 6 were prepared in the same manner as in Example 1 except the substrate and the transparent resin layer in Example 1 were changed to the substrates and the transparent resin layers, respectively, shown in Table 2. Using the obtained decorative materials, samples were prepared based on the above method and evaluated. The results are shown in Table 2.

TABLE 2

|  |  | Example | | | Comparative Example | |
| --- | --- | --- | --- | --- | --- | --- |
|  |  | 4 | 5 | 6 | 3 | 4 |
| White pigment particles Ti:Al:Si mass ratio (Ti = 1) | Al | 0.05 | 0.05 | 0.05 | 0.05 | 0.05 |
|  | Si | 0.003 | 0.003 | 0.003 | 0.003 | 0.003 |
| Substrate | Material | Polyolefin | Polyolefin | Polyvinyl chloride | Polyvinyl chloride | Polyolefin |
|  | Thickness | 60 μm | 60 μm | 120 μm | 120 μm | 100 μm |
|  | Degree of crystallinity | 50% | 40% | — | — | 70% |
| Transparent resin layer | Material | Polyolefin | Polyolefin | — | — | Polyolefin |
|  | Thickness | 80 μm | 40 μm | — | — | 100 μm |
| Weatherability |  | B | B | B | B | B |
| Dispersion |  | A | A | A | A | A |
| Water vapor transmission rate (g/m$^2$ · 24 h) |  | 5 | 10 | 35 | 50 | 0.5 |
| Application suitability |  | A | A | A | A | C |
| Long-term adhesion |  | A | A | B | C | A |
| Processing suitability |  | A | A | A | C | A |

The polyolefin in the above table is the polypropylene resin used in Example 1, and each sheet thickness was as shown in the table.

The substrates used in Example 6 and Comparative Example 3 are as follows.

Substrate in Example 6: Polyvinyl Chloride Resin Sheet (Thickness: 120 μm)

The substrate was prepared by extrusion-molding a resin composition in which 38 parts by mass of a phthalate plasticizer (undecylic phthalate (DUP)) was added based on 100 parts by mass of a polyvinyl chloride resin as a plasticizer.

Substrate in Comparative Example 3: Polyvinyl Chloride Resin Sheet (Thickness: 120 μm)

The substrate was prepared in the same manner as in Example 6 except the plasticizer in the substrate of the above Example 6 was changed to a polyester plasticizer (adipate polyester) and the content thereof was changed to 33 parts by mass based on 100 parts by mass of the polyvinyl chloride resin.

The results of Table 1 and Table 2 verified that the decorative material of the present embodiment has excellent coating suitability due to the predetermined water vapor transmission rate in addition to the excellent weatherability by using the titanium oxide particles having the particular coating as the white pigment, as well as the decorative member of the present embodiment which uses such a decorative material has the excellent long-term adhesion.

On the other hand, the results of Comparative Examples 1 and 2 verified that a mass ratio of Al to Ti and a mass ratio of Si to Ti (Condition 1) outside the ranges fail to obtain the intended characteristics in the weatherability and the dispersion. Comparative Example 3 further verified that a water vapor transmission rate, which is too high, fails to obtain the excellent long-term adhesion. because the decorative sheet degrades by the hydrolysis of the adhesive forming the adhesive layer and moisture in the atmosphere. Comparative Example 4 additionally verified that a water vapor transmission rate, which is too low, fails to obtain the excellent application suitability because the adhesive forming the adhesive layer cannot achieve favorable curing condition and causes an. initial tight contact strength to be lower.

Industrial Applicability

The decorative sheet and the decorative material of the present invention have excellent. weatherability, and are therefore especially useful as an exterior decorative material.

Reference Signs List 1. substrate
2. surface protective layer
3. backing substrate
4. decorative layer
5. transparent resin layer
6. primer layer
7. adhesive layer A
8. adhesive layer B
10. decorative sheet
20. adherend
a. white pigment particle

The invention claimed is:

1. A decorative sheet comprising at least a substrate and a surface protective layer, wherein the surface protective layer contains an ultraviolet absorber, and the substrate contains white pigment particles, and wherein
the white pigment particles are titanium oxide particles having a coating containing Al element and Si element and formed on part or the whole of their surfaces, and contain Ti, Al and Si elements in a mass ratio defined in the following (Condition 1), and
a water vapor transmission rate of the decorative sheet satisfies the following (Condition 2):

(Condition 1)

when Ti is taken as 1,

Al is not less than 0.02 and less than 0.20, and Si is more than 0.002 and not more than 0.070, (Condition 2)

a water vapor transmission rate of the decorative sheet when measured in accordance with Testing Methods for Determination of the Water Vapor Transmission Rate of Moisture-Proof Packaging Materials, Dish Method, defined in JIS Z0208:1976 is not less than 0.75 $g/m^2 \cdot 24$ h and not more than 45 $g/m^2 \cdot 24$ h.

2. The decorative sheet according to claim 1, wherein the substrate further contains a hindered amine light stabilizer.

3. The decorative sheet according to claim 1, wherein the ultraviolet absorber is a triazine ultraviolet absorber.

4. The decorative sheet according to claim 1, wherein a value of [(a×b)/100], obtained by dividing the product of content a, in % by mass, of the white pigment particles in the substrate and a thickness b, in μm, of the substrate by 100, is not less than 0.1 and not more than 20.

5. The decorative sheet according to claim 1, wherein a backing substrate, the substrate and the surface protective layer are disposed in this order.

6. The decorative sheet according to claim 1, further comprising a decorative layer between the substrate and the surface protective layer.

7. The decorative sheet according to claim 1, further comprising a transparent resin layer between the substrate and the surface protective layer.

8. A decorative material comprising an adherend and the decorative sheet according to claim 1.

9. The decorative material according to claim 8, further comprising an adhesive layer between the decorative sheet and the adherend.

10. The decorative material according to claim 9, wherein the adhesive layer is constituted by a urethane adhesive.

11. The decorative material according to claim 10, wherein the urethane adhesive is a moisture curing adhesive.

12. The decorative material according to claim 8, wherein the adherend is a wood member, a metal member, a ceramic member, or a resin member.

* * * * *